(12) United States Patent
Fulks

(10) Patent No.: US 7,305,723 B2
(45) Date of Patent: Dec. 11, 2007

(54) KITCHEN SINK WITH INTEGRATED CUTTING BOARD

(76) Inventor: Jimmy J. Fulks, 3135 River Grove Cir., Fort Myers, FL (US) 33905

( * ) Notice: Subject to any disclaimer, the term of this patent is extended or adjusted under 35 U.S.C. 154(b) by 210 days.

(21) Appl. No.: 11/210,356

(22) Filed: Aug. 25, 2005

(65) Prior Publication Data

US 2007/0044228 A1    Mar. 1, 2007

(51) Int. Cl.
*E03C 1/33*    (2006.01)
(52) U.S. Cl. .......................................................... 4/631
(58) Field of Classification Search ............ 4/631–637, 4/656, 657; 134/115 R, 135
See application file for complete search history.

(56) References Cited

U.S. PATENT DOCUMENTS

| | | | |
|---|---|---|---|
| 2,194,343 A * | 3/1940 | Wexler | ........................... 4/637 |
| 2,308,123 A | 1/1943 | Stein | |
| 2,314,157 A | 3/1943 | O'Brien | |
| 2,334,293 A | 11/1943 | Stein | |
| 2,579,393 A | 12/1951 | Modrey | |
| 2,658,205 A | 11/1953 | Bowden | |
| 3,346,886 A | 10/1967 | Kashiwamura | |
| 3,625,162 A | 12/1971 | Crew | |
| 4,041,964 A | 8/1977 | Shamoon | |
| 4,305,166 A | 12/1981 | Rose | |
| 4,456,021 A | 6/1984 | Leavens | |
| 4,765,603 A | 8/1988 | Huppert | |
| 5,016,298 A | 5/1991 | Rise et al. | |
| 5,313,676 A | 5/1994 | Wright | |
| 5,406,656 A | 4/1995 | Somerton | |
| 5,621,929 A | 4/1997 | Smith | |
| 5,815,855 A | 10/1998 | McKeehan et al. | |
| D415,661 S | 10/1999 | Georgeovich | |
| 5,996,983 A | 12/1999 | Laurenzi | |
| 6,182,305 B1 | 2/2001 | O'Connell et al. | |
| 6,193,879 B1 * | 2/2001 | Bowman | ..................... 210/153 |
| 6,276,675 B1 | 8/2001 | Shamoon | |
| D449,875 S | 10/2001 | Fluidd-Robinson et al. | |
| 6,309,035 B1 | 10/2001 | Lye et al. | |
| 6,341,770 B1 | 1/2002 | Landherr | |
| 6,371,470 B1 | 4/2002 | Ward | |
| D483,531 S * | 12/2003 | Shelley | ......................... D32/2 |
| 6,814,090 B2 | 11/2004 | DeBoer et al. | |

* cited by examiner

*Primary Examiner*—Huyen Le
(74) *Attorney, Agent, or Firm*—William S. Dorman

(57) ABSTRACT

A sink with an integrally molded recessed dish drain area adjacent to the sink basin and which incorporates an integrated reversible utility board that may be hinged or unhinged with the under side of the utility board providing a cutting board/work station surface which can conveniently and efficiently aid in the preparation of food by cutting, dicing or chopping, vegetables or meats. etc., with minimal inconvenience. The arrangement comprises a sink having at least one basin with a garbage/waste disposal and a molded or formed recessed area that may serve as a dish drain area and such drain area when not in use may be enclosed by the utility board. This new and improved arrangement for a utility board/work station provides a reversible utility board that is molded/contoured and is supported by at least two sides of the top area of the recessed flange and over the dish drain basin.

16 Claims, 5 Drawing Sheets

KITCHEN SINK WITH INTEGRATED CUTTING BOARD

BACKGROUND OF THE INVENTION

1. Field of the Invention

The present invention relates to a kitchen sink having a cutting board/work station integrated therewith. More specifically, the present invention involves a versatile, novel folding, utility board/cutting board/work station that may be hinged (or unhinged) and used for preparing, cutting, slicing, dicing or other operations on food products and which fits predominately adjacent to the disposal/sink area in an open position and when covered, in the stored or closed position, overlies the dish drain area and does not take up kitchen counter space or sink space. The underside of the utility board may serve as a cutting board to thereby provide the ability to perform several tasks in one single area of the kitchen, eliminating the need to perform excessive turns and steps.

2. Prior Art

There are many constructions involving sinks and cutting boards, but the art fails to disclose the present combination of utility board/work board station integrated with a kitchen sink.

A preliminary search was conducted on the present invention and the following references were uncovered in the search;

| Inventor | Patent No. | Date |
| --- | --- | --- |
| Georgeovich | Des. 415,661 | Oct. 26, 1999 |
| Fludd-Robinson et al | Des. 449,875 | Oct. 30, 2001 |
| C. Stein | 2,308,123 | Jan. 12, 1943 |
| V. R. O'Brien | 2,314,157 | Mar. 16, 1943 |
| Stein | 2,334,293 | Nov. 16, 1943 |
| Modrey | 2,579,393 | Dec. 18, 1951 |
| Bowden | 2,658,205 | Nov. 10, 1953 |
| Kasiwamura | 3,346,886 | Oct. 17, 1967 |
| Crew | 3,625,162 | Dec. 7, 1971 |
| Shamoon | 4,041,964 | Aug. 16. 1977 |
| Rose | 4,305,166 | Dec. 15, 1981 |
| Leavens | 4,456,021 | Jun. 26, 1984 |
| Huppert | 4,765,603 | Aug. 23, 1988 |
| Ris et al | 5,016,298 | May 21, 1991 |
| Wright | 5,313,676 | May 24, 1994 |
| Somerton | 5,406,656 | Apr. 18, 1995 |
| Smith | 5,621,929 | Apr. 22, 1997 |
| McKeehan et al | 5,815,855 | Oct. 6, 1998 |
| Laurenzi | 5,996,983 | Dec. 7, 1999 |
| O'Connell et al | 6,182,305B1 | Feb. 6, 2001 |
| Shamoon | 6,276,675B1 | Aug. 21, 2001 |
| Lye et al | 6,309,035B1 | Oct. 30, 2001 |
| Landherr | 6,341,770B1 | Jan. 29, 2002 |
| Ward | 6,371,470B1 | Apr. 16, 2002 |
| DeBoer et al | 6,814,090B2 | Nov. 9, 2004 |

Georgeovich Design U.S. Des. Pat. No. 415,661 shows a cutting board straddling a pair of adjacent sink basins.

Fludd-Robinson et al U.S. Des. Pat. No. 449,875 shows a combined sink cover and cutting board.

C. Stein U.S. Pat. No. 2,308,123 shows a lid over a sink.

V. R. O'Brien U.S. Pat. No. 2,314,157 shows a work board in combination with a sink.

Stein U.S. Pat. No. 2,334,293 shows a cover for a sink.

Modrey U.S. Pat. No. 2,579,393 shows a lid for a sink.

Bowden U.S. Pat. No. 2,658,205 shows a drain board.

Kasiwamura U.S. Pat. No. 3,346,886 shows a work board.

Crew U.S. Pat. No. 3,625,162 shows a utility board supported over two sinks.

Shamoon U.S. Pat. No. 4,041,964 shows a cutting board for sinks.

Rose U.S. Pat. No. 4,305,166 shows a reversible sink cover.

Leavens U.S. Pat. No. 4,456,021 shows a cutting board supported by the top edge of a sink.

Huppert U.S. Pat. No. 4,765,603 shows a cutting board supported over a sink.

Ris et al U.S. Pat. No. 5,016,298 shows a cutting board and colander for a sink.

Wright U.S. Pat. No. 5,313,676 shows an extension placed to one side of the sink.

Somerton U.S. Pat. No. 5,406,656 shows a sink cover/cutting board.

Smith U.S. Pat. No. 5,621,929 shows a cabinet 11 whose upper regions are closed by a plenum chamber 12. Plenum chamber 12 includes two work facilities 14 and 15. Smith provides a block of solid material 16 which fits in a trough at the top of the work facility 14. The work area 15 is defined as a sink having a drain outlet. The block 16 is not described as a cutting block, although presumably it could be. There is no drain area located below the block 16.

McKeehan et al U.S. Pat. No. 5,815,855 shows a sink cover designed for double sinks.

Laurenzi U.S. Pat. No. 5,996,983 shows a board and waste container arrangement for a work surface.

O'Connell et al U.S. Pat. No. 6,182,305B1 shows a sink with various cooking utensils employed in conjunction with a cutting board.

Shamoon U.S. Pat. No. 6,276,675B1 shows a cutting board.

Lye et al U.S. Pat. No. 6,309,035B1 shows a combination cutting board and countertop system.

Landherr U.S. Pat. No. 6,341,770B1 shows a cutting board combination for a sink.

Ward U.S. Pat. No. 6,371,470B1 shows a cutting board with funnel.

DeBoer et al U.S. Pat. No. 6,814,090B2 shows an in-sink dishwasher with cutting board.

SUMMARY OF THE INVENTION

A kitchen sink with at least one basin consisting of a disposal and a built-in molded/recessed drain area that supports and incorporates a folding utility board that may be hinged or unhinged and used for cutting food, to predominantly fit adjacent to the disposal/sink are. When hinged, the hinge may be a cylinder type hidden hinge that is not visible when the utility board is in the closed position over the drain area. The finished top side of the utility board may match the finished surface of the kitchen sink countertop area, such as Corian™ or stainless steel but which may provide a cutting surface on the reverse side or underside which when folded to the open position may serve as a cutting surface for food. The utility board, when not in use and in the closed position, serves as a normal kitchen countertop. The utility board corresponds in its contour approximately with that of the molded recessed drain area which it overlies and is molded in such a way as to limit its movement when in the stored position. The recessed area covered by the utility board may double as a sink drain/drying rack area with protrusions molded in to support dishes. When the dish drain is not in use and the utility board is folded to the open position over the countertop, the top-side, now outward side, of the utility board, may dual as a cutting surface from which the waste can be wiped directly into the garbage disposal. The utility board, when in the open position for use, can be elevated or inclined to drain to the sink disposal area.

DETAILED DESCRIPTION OF THE DRAWINGS

Figure 1:
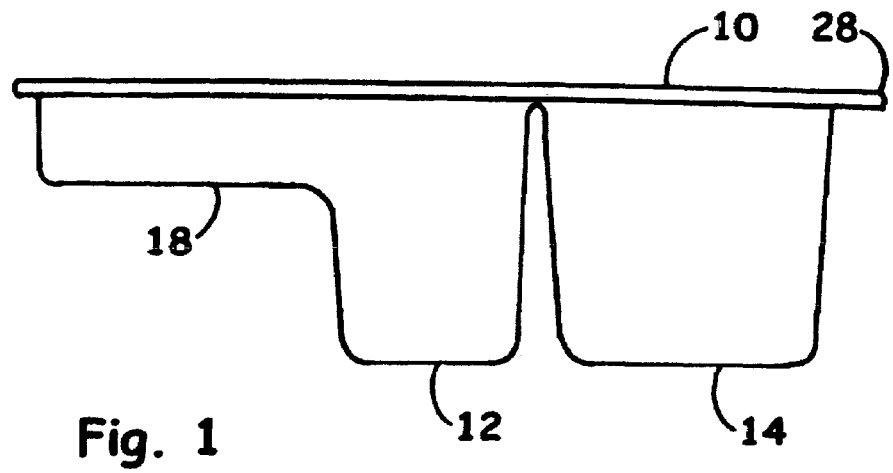
FIG. 1 is a side elevation showing the outline of a double basin sink in which the utility board of the present invention may be incorporated.
Figure 2:
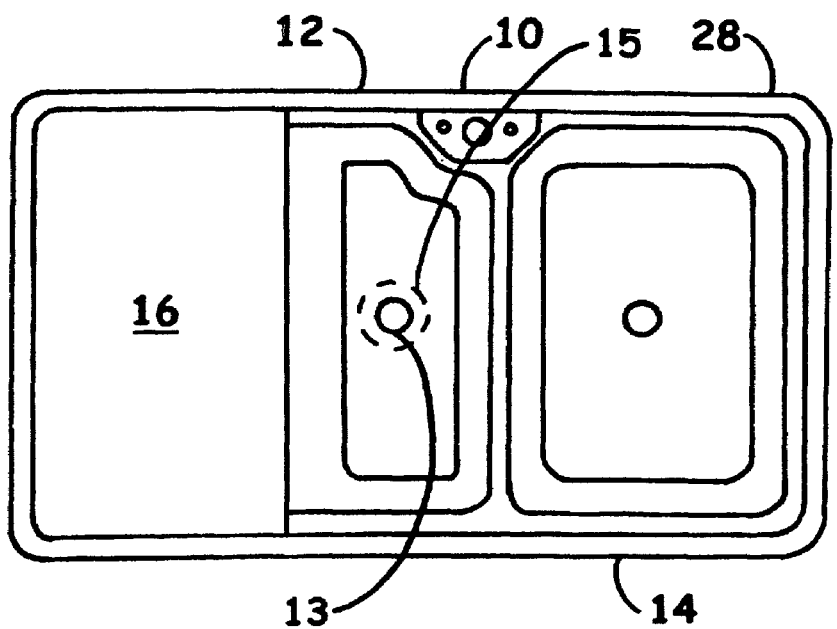
FIG. 2 is a plan view of the sink shown in FIG. 1 with the utility board in place.

Referring to the drawings in detail, FIGS. 1 and 2 show the outline of a sink 10 having a left-hand basin 12 and a right-hand basin 14. Normally the basin 12 connects with a conventional kitchen disposal 15 through a drain outlet 13.

For the purpose of this present invention, the sink 10 incorporates a utility board 16 which overlies the left-hand sink 12. Utility board 16 covers a recessed area 18 of the sink 12. The recessed area 18 can be adapted to support dishes (not shown) thereon and therefore serves as a drain area.

Figure 5:
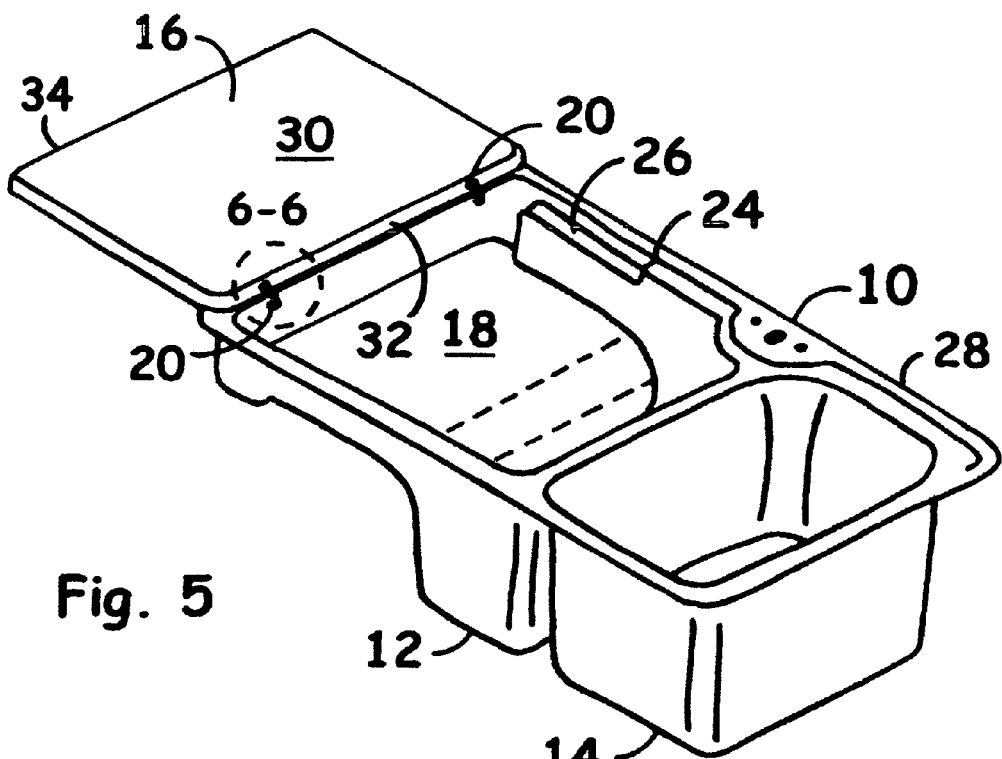
FIG. 5 is a view similar to FIG. 4 showing the utility board in a fully opened position and flush with the countertop in the kitchen.
Figure 7:
FIG. 7 is a side elevation, in perspective, of a typical double cylinder hinge.

In FIG. 5 the utility board 16 is shown as connected to the sink though a pair of hinge elements 20. The hinge elements may be of the double cylinder type 20 as diagrammatically shown in FIG. 7.

Figure 8:
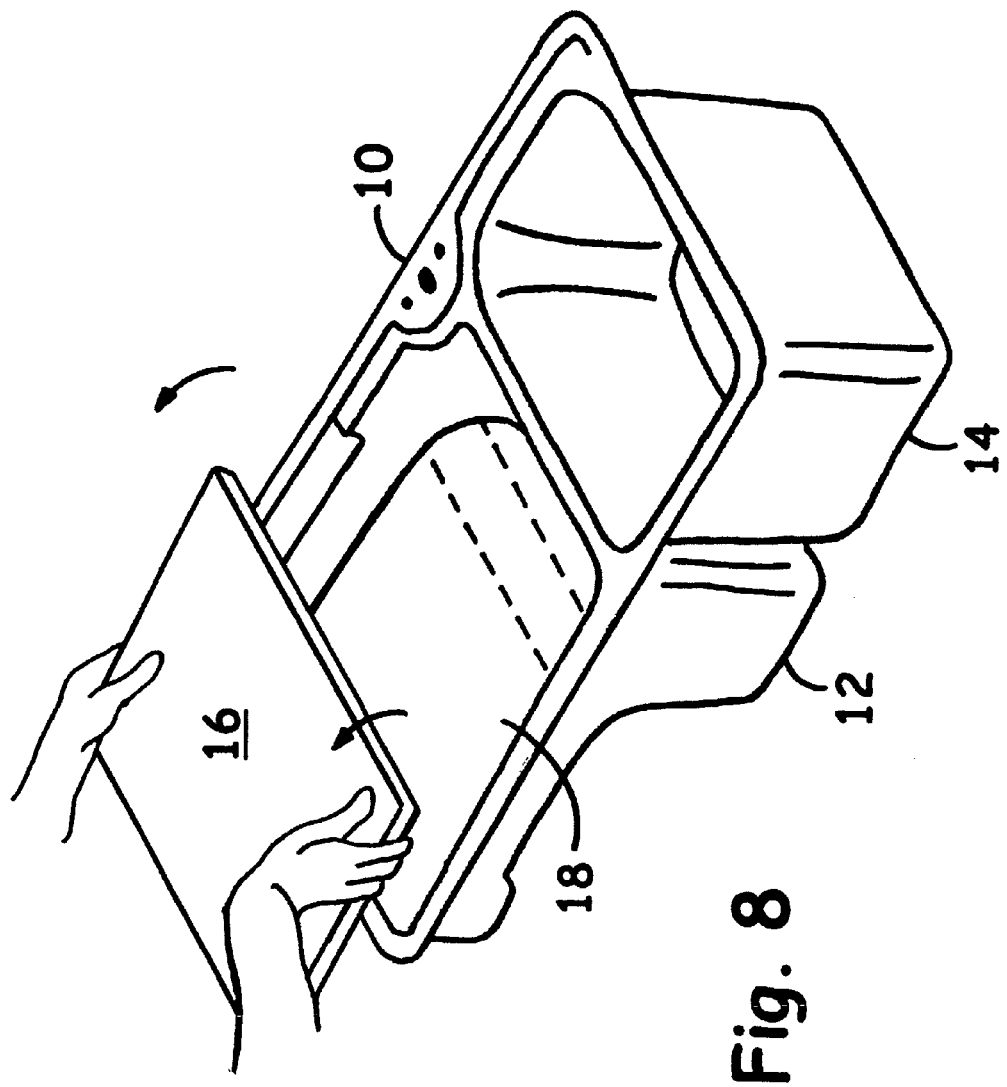
FIG. 8 is a perspective showing the utility board separate (i.e., unconnected) from the sink.

In FIG. 8 the utility board 16 is shown as being separate from the sink (i.e., not connected by a hinge or otherwise) so that it can be placed by hand over the recessed area 18 of the left-hand sink 12.

Figures 3, 4:
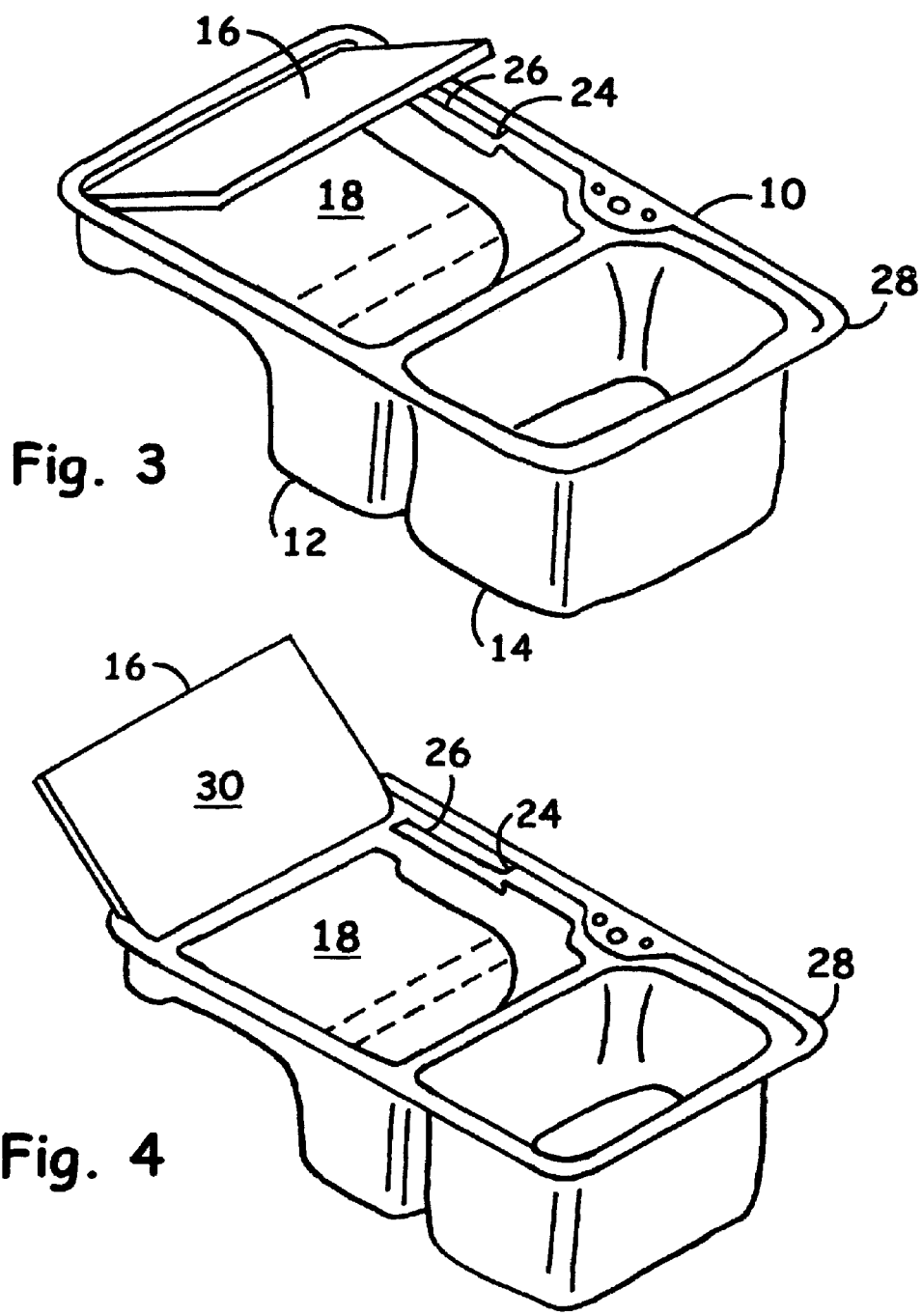
FIG. 3 is a perspective view of the sink shown in FIG. 2 with the utility board partly opened.
FIG. 4 is a view similar to FIG. 3 but with the utility board further opened.

Referring to FIGS. 3 and 4, the left-hand sink includes a recess 24 whose lower surface or shelf 26 serves to support the utility board 16 when it is in a (first) closed position over the drain area 18. As indicated heretofore, the sink 10 is molded or otherwise formed in such a way as to limit the movement of the utility board 16 when in a the closed position; that is, the vertical height of the recess 24 is approximately equal to the thickness of the utility board 16 and the longitudinal extent of the shelf 26 from the left side of the sink to the notch at the right is approximately equal to the length of the utility board 16 so that it fits snugly into the lip (see below) of the sink in parallel relation with the recessed area 18. In a preferred embodiment, the utility board may be substantially rectangular and is shaped so that its contour approximates that of the molded recessed area 18. The sink ensemble 10 also includes an outer peripheral lip 28 which will rest on the countertop when the assembly 10 is placed into suitable openings (not shown) in the countertop (not shown).

The under side 30 of the utility board as shown in FIG. 4 is preferably provided with whatever surface configurations are required to make it a proper utility board. In fact, the surface 30 could be located on a separate member (not shown) which slides in and out of the utility board 16. At any event, when the utility board 16 is lying flat on the countertop (not shown) in its second or open position, it may serve as a cutting board from which food materials may be scraped off the board and into the sink to go into the disposal 15 which is in the left-hand sink 12.

Referring now to FIG. 5 where the utility board 16 is shown in the open position, the board has a near edge 32 adjacent the sink 12 and a remote edge 34 opposite therefrom. For the purpose of assisting in obtaining drainage from the cutting surface 30, the remote edge 34 may be slightly higher (thicker) than the near edge 32 so as to provide a slight downward slope (e.g. 2 degree) of the surface 30 toward the sink 12. If desired, the slope could be slightly greater.

Figure 6:
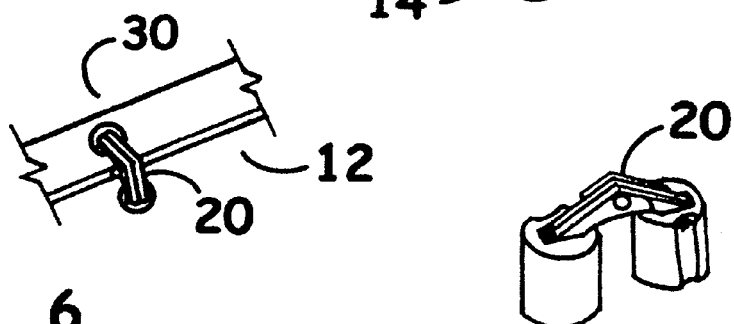
FIG. 6 is a sectional view taken along section line 6-6 of FIG. 5 showing the details of the hinge that might be incorporated between the utility board and the sink of FIG. 5.

FIG. 5 also shows that the utility board is attached to the sink 12 by means of a pair of hinges 20 that connect the edge 32 to the adjacent part of the sink 12. The hinges 20 can be any suitable type and, purely for purposes of illustration, in FIGS. 6 and 7 the hinges 20 are shown as of the double cylinder type.

Figure 9:
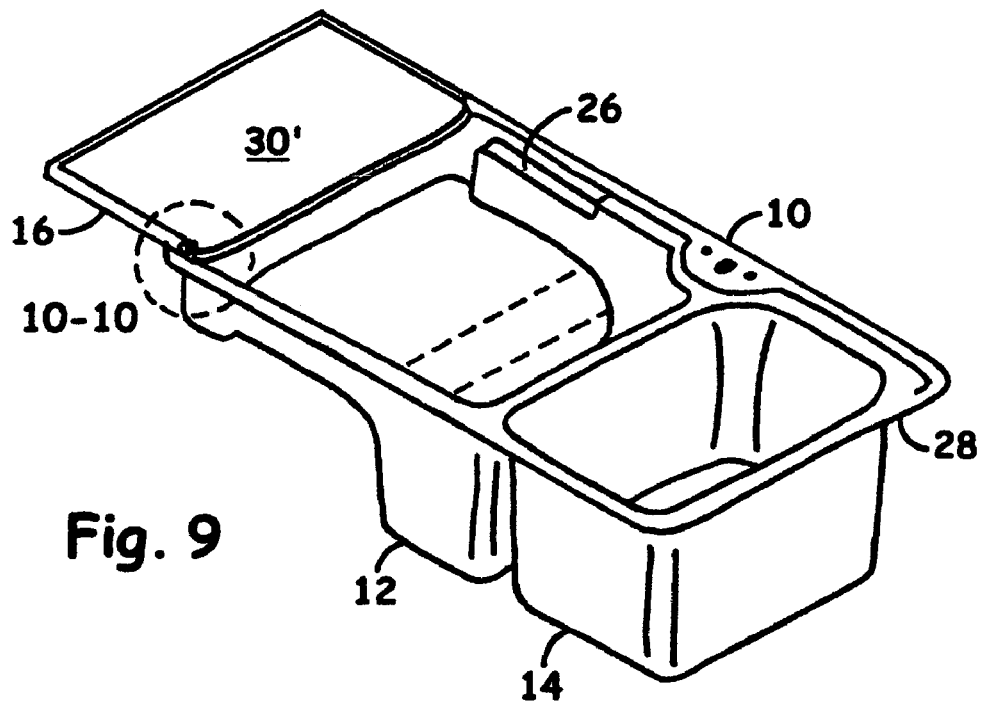
FIG. 9 is a perspective view of the sink showing a removable cutting board slidably engaging the utility board.
Figure 10:
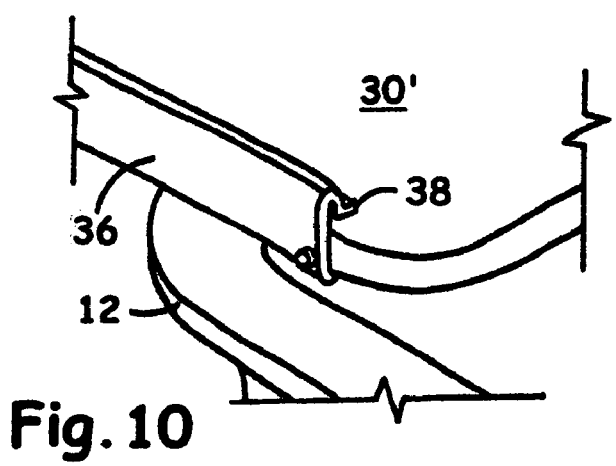
FIG. 10 is a detail taken along viewing line 10-10 showing the cutting board as slidably received in the utility board.

Referring now to FIGS. 9 and 10, the utility board 16 has a slidable and removable cutting board 30' which is held in place by a rim 36 which is part of the utility board 16. The rim 36 has a lip 38 which is bent over and bears against the upper surface of the cutting board 30' to hold it in place and also to prevent liquids from going over the edge of the utility board 16. Side 34 has been described as being slightly thicker than 32 so as to provide at least a two degree slope toward the drain 12.

In the embodiment of FIGS. 9 and 10, the utility board 16 may be made of stainless steel and the cutting board 30' may be made of Corian™ or other suitable material having properties consistent with the replaceable board being a cutting board.

Whereas the present invention has been described in particular relation to the above disclosure, including the drawings, other and further modifications, apart from those shown or suggested herein may be made within the spirit and scope of this invention.

What is claimed is:

1. A sink having a sink basin which includes a garbage/waste disposal, the sink having an integrally molded recessed dish drain area adjacent to the sink basin, the sink having a peripheral horizontal lip for receiving the sink in a suitable opening in a countertop, a substantially rectangular utility board adapted to be supported in a first position above and parallel to the dish drain area and corresponding in contour to that of the dish drain area, an underside of the utility board providing a cutting surface which can conveniently and efficiently aid in the preparation of food by cutting, dicing or chopping, the cutting surface being an upper surface of the utility board when the latter is disposed to one side of the sink and over the countertop in a second position of the utility board, the lip having horizontal recesses therein which are equal in height to the thickness of the utility board and which are adapted to receive the utility board snugly therein in the first position above the horizontal drain area, whereby materials can be cut and sliced when the utility board is in the open position and thereafter scraped off to a drain outlet of the sink.

2. A sink as set forth in claim 1 wherein the utility board is connected to the sink body by hinges which permit the flipping of the utility board from the closed position to the open position.

3. A sink as set forth in claim 1 wherein the configured cutting surface of the utility board is on a separate element which can be slidable inserted into the utility board itself.

4. A sink as set forth in claim 1 where the utility board is sloped toward the sink basin when it is in the open position to allow materials to drain off the cutting surface towards the sink.

5. A sink comprising at least one basin having a dish drain area and drain and a utility board having a contour corresponding to that of the dish drain area and adapted for removable engagement with a recessed shelf in said at least one basin, wherein the utility board is rotatably connected to the at least one basin and movable between a closed position and an open position, the utility board being in its closed position when engaged with the shelf such that a top surface of the utility board is substantially flush with a countertop to which the sink is secured, and the utility board being in its open position when the top surface of the utility board is resting on the countertop adjacent the sink.

6. A sink as set forth in claim 5 wherein the utility board is hingedly connected to the said at least one basin.

7. A sink as set forth in claim 5 wherein an underside of the utility board includes a cutting surface that can be used to prepare food when the utility board is in its open position.

8. A sink as set forth in claim 7 wherein the cutting surface is disposed on a separate element that is removably attachable to the utility board.

9. A sink as set forth in claim 5 wherein the utility board is sloped toward the sink basin when in its open position to allow materials to drain off the utility board towards the sink.

10. A sink comprising at least one basin having a recessed drain area and drain, and a utility board attached to the at least one basin and adapted for removable engagement with a recessed shelf in the at least one basin, the utility board corresponding in contour to that of the dish drain area and being in a closed position when engaged with the shelf such that a top surface of the utility board is substantially flush with a countertop to which the sink is secured, and the utility board being in an open position when the top surface of the utility board is resting on the countertop adjacent the sink.

11. A sink as set forth in claim 10 wherein the utility board is hingedly connected to the at least one basin.

12. A sink as set forth in claim 10 wherein an underside of the utility board includes a cutting surface that can be used to prepare food when the utility board is in its open position.

13. A sink as set forth in claim 12 wherein the cutting surface is disposed on a separate element that is removably attachable to the utility board.

14. A sink as set forth in claim 10 wherein the utility board is sloped towards the sink basin when in its open position to allow materials to drain off the utility board towards the sink.

15. A sink as set forth in claim 10 wherein the recessed shelf includes horizontal recesses therein which are equal in height to the thickness of the utility board and which are adapted to receive the utility board snugly therein.

16. A sink as set forth in claim 10 further including a garbage/disposal connected to the at least one basin.

* * * * *